(No Model.)

T. J. BRAY.
DRIVE SCREW.

No. 289,333. Patented Nov. 27, 1883.

Witnesses
Thomas W. Bakewell
W. B. Corwin

Inventor
Thos. J. Bray
by his attys
Bakewell & Kerr

UNITED STATES PATENT OFFICE.

THOMAS J. BRAY, OF PITTSBURG, PENNSYLVANIA, ASSIGNOR TO OLIVER BROTHERS & PHILLIPS, OF SAME PLACE.

DRIVE-SCREW.

SPECIFICATION forming part of Letters Patent No. 289,333, dated November 27, 1883.

Application filed October 25, 1883. (No model.)

*To all whom it may concern:*

Be it known that I, THOMAS J. BRAY, of Pittsburg, in the county of Allegheny and State of Pennsylvania, have invented a new and useful Improvement in Drive-Screws; and I do hereby declare the following to be a full, clear, and exact description thereof.

Heretofore lag and drive screws have commonly been made with conical or conoidal points of varying shapes and angles, and with V-threads, the base of the point being equal in diameter to the shank of the bolt. When such screws are driven into the wood, they tear and lacerate the fibers to a greater or less extent, according to the shape and size of the point. When such screws are driven into a hole of the size of the shank at the bottom of the thread, there is no guide by which an equal pressure or bearing can be insured all around the hole, and the consequence is that a bolt, when thus driven, will not align properly and loses much of the holding power of the thread, while in soft spongy wood it often fails to hold at all, and can be as easily withdrawn as a nail.

My improvement consists in making a lag, wood, or drive screw, having a conical, tapering, or conoidal point, the base of which is of the same diameter as the shank of the bolt at the bottom of the thread, and with a cylindrical part between the base of the point and the commencement of the thread, to act as a guide or leading-point, in conjunction with a ratchet-thread, which will act as a wedge in still further separating the fibers without lacerating the same and weakening the hold of the screw.

To enable others skilled in the art to make and use my improvement, I will now describe it by reference to the accompanying drawings, in which—

Figure 1:
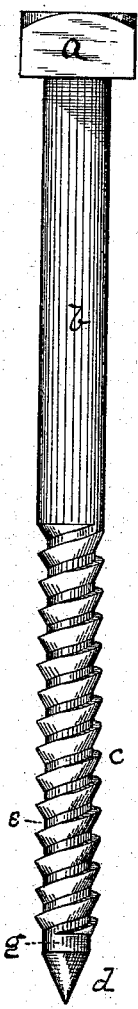
Figure 2:
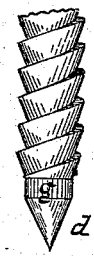

Figure 1 is a side elevation of my improved drive-screw. Fig. 2 is a view of a portion of the drive-screw with a slightly-modified form of thread.

The screw has a head, $a$, shank $b$, a portion of which is ratchet-threaded, as at $c$ and point $d$.

In Fig. 1 there is a cylindrical portion of the core, showing between the turns of the thread, as at $e$. The diameter of the base of the point $d$ is equal to the diameter of the cylindrical part or core $e$. Between the base of the point and the commencement of the thread $c$ is a cylindrical part, $g$, which is of the same diameter as the base of the point. This part $g$ forms a guide or leading-point in driving the screw, causing it to align perfectly when driven into a previously-bored hole. Such holes are usually made of a diameter equal to that of the core at the bottom of the threads. I prefer to make the length of the cylindrical part $g$ about equal to one-half the pitch of the thread, or slightly longer. I do not, however, limit myself to any particular length.

Practical experience has demonstrated that the laceration of the fibers of the wood, which is consequent upon the use of drive-screws, is due in a great measure to the point, and in a measure to the V shape of the thread, and that when the point is equal, or nearly equal, in diameter to the diameter of the shank at the top of the threads, the wood will be much more seriously injured and lacerated than in the use of a leading-point, and especially if the thread has a ratchet form, such as is shown in the drawings of this case. After the small point has passed into the wood and opened the fiber, the threads simply separate the fibers still farther without tearing them. This separation causes the fibers which remain unbroken to be compressed and to spring back over the base of the threads; hence, by the use of my improved screw I preserve the elasticity of the fibers to a much greater degree than where a large point is used, and obtain a much better hold or grip in the wood.

In using the screw with hard woods, where a hole is previously bored for its reception, such holes should be made the size of the cylindrical part $g$, which then becomes a guide, insuring the perfect alignment of the screw with the hole.

In Fig. 2 I show another form of ratchet-thread, in which the inclined portion of one thread runs to the base of the next succeeding thread.

Having thus described my invention, what I claim, and desire to secure by Letters Patent, is—

A lag, wood, or drive screw having a ratchet-thread and a tapering or conoidal point, the base of which is of the same diameter as the core of the screw at the bottom of the thread, and a cylindrical part between the base of the point and the commencement of the thread, substantially as and for the purposes described.

In testimony whereof I have hereunto set my hand this 22d day of October, A. D. 1883.

THOMAS J. BRAY.

Witnesses:
W. B. CORWIN,
T. B. KERR.